3,016,381
5,6,7,8-TETRAHYDROQUINOLINE-3-CARBOX-AMIDE AND DERIVATIVES

Aaron Cohen and Anthony Mesnard Parsons, Welwyn Garden City, England, assignors to Hoffmann-La Roche Inc., Nutley, N.J., a corporation of New Jersey
No Drawing. Filed Nov. 25, 1959, Ser. No. 855,271
Claims priority, application Great Britain Dec. 18, 1958
3 Claims. (Cl. 260—287)

The present invention is concerned with novel pyridine derivatives and the manufacture thereof.

The novel pyridine derivatives of this invention are compounds of the following general formula:

(I)
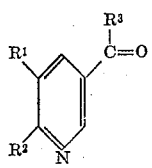

wherein $R^1$ and $R^2$ stand for identical or different alkyl groups, preferably lower alkyl groups, containing a total of three to ten carbon atoms, or $R^1$ and $R^2$ together stand for the tetramethylene group, and $R^3$ stands for the amino group, a lower alkoxy or alkylamino group, preferably a lower alkylamino group, and salts thereof.

These substances exert a vasodilatory action which is unaccompanied by parasympathomimetic or sympatholytic effects and are useful as therapeutic agents in the treatment of vascular ailments such as hypertension, peripheral vascular disorders, etc. A compound having Formula I above or a non-toxic, medicinally acceptable salt thereof may be administered orally or parenterally in conventional dosage forms such as tablets, capsules, elixirs, injectables and the like.

The compounds of the foregoing general formula in which $R^3$ stands for the amino group or lower-alkoxy group are manufactured in accordance with the invention by treating the appropriate 5,6-substituted-2-hydroxy-3-cyano-pyridine with phosphoryl chloride, in the presence of a tertiary base if desired, in order to give the corresponding substituted 2-chloro-3-cyanopyridine, removing the chlorine atom selectively with zinc and acetic acid in the presence of sodium acetate and either hydrolyzing the resulting substituted 3-cyanopyridine with water in the presence of a Lewis acid, such as boron trifluoride, so as to convert the cyano group therein to a carboxyamide group, or by boiling the same with a lower alkanol in the presence of a strong acid, e.g. a mineral acid such as hydrochloric acid, so as to convert the cyano group therein to a carboxylic acid ester group.

An alternative process for the manufacture of the compounds of the foregoing general formula in which $R^3$ stands for a lower alkoxy group consists in converting the appropriate 5,6 - substituted-2-hydroxypyridine-3-carboxylic acid to the corresponding substituted 2-chloropyridine-3-carbonyl chloride with phosphoryl chloride in the presence of phosphorus pentachloride, treating said carbonyl chloride compound with a lower alkanol, in an inert solvent if desired, and dechlorinating the chloro-ester so obtained with hydrogen in the presence of a hydrogenation catalyst or with zinc in acetic acid in the presence of sodium acetate.

The compounds of the foregoing general formula in which $R^3$ stands for a lower alkylamino group are manufactured in accordance with the invention by preparing the substituted 2-chloropyridine-3-carbonyl chloride in the manner aforesaid and adding this carbonyl chloride to an excess of an alkylamine, such as methylamine, ethylamine, etc., in an inert solvent if so desired, and reducing the resulting substituted 2-chloropyridine-3-carboxamide with hydrogen in the presence of a hydrogenation catalyst, such as palladium, or with zinc and acetic acid so as to eliminate the 2-chloro group therein.

The compounds of Formula I form acid addition and quaternary salts. The salts are obtained by treating a compound of Formula I with the appropriate acid or alkylating agent. The compounds of the above formula, for example, form acid salts such as the hydrohalides, e.g. hydrochloride, hydrobromide, etc., sulfates, nitrates, phosphates and the like, with mineral acids or similar acid salts with other inorganic acids. Salts may also be formed from organic acids such as tartaric acid, citric acid, ascorbic acid, benzoic acid, benzenesulfonic acid, toluenesulfonic acid, and the like. Quaternary salts may be produced by reacting a compound of Formula I with an alkylating agent such as lower alkyl halide, e.g. methyl chloride, methyl bromide, methyl iodide, ethyl chloride, etc., a lower alkyl sulfate, etc.

It will be appreciated that the 2-hydroxy compounds referred to herein may also be referred to as 2-keto-1,2-dihydro compounds owing to tautomerism.

The following flowsheet is illustrative:

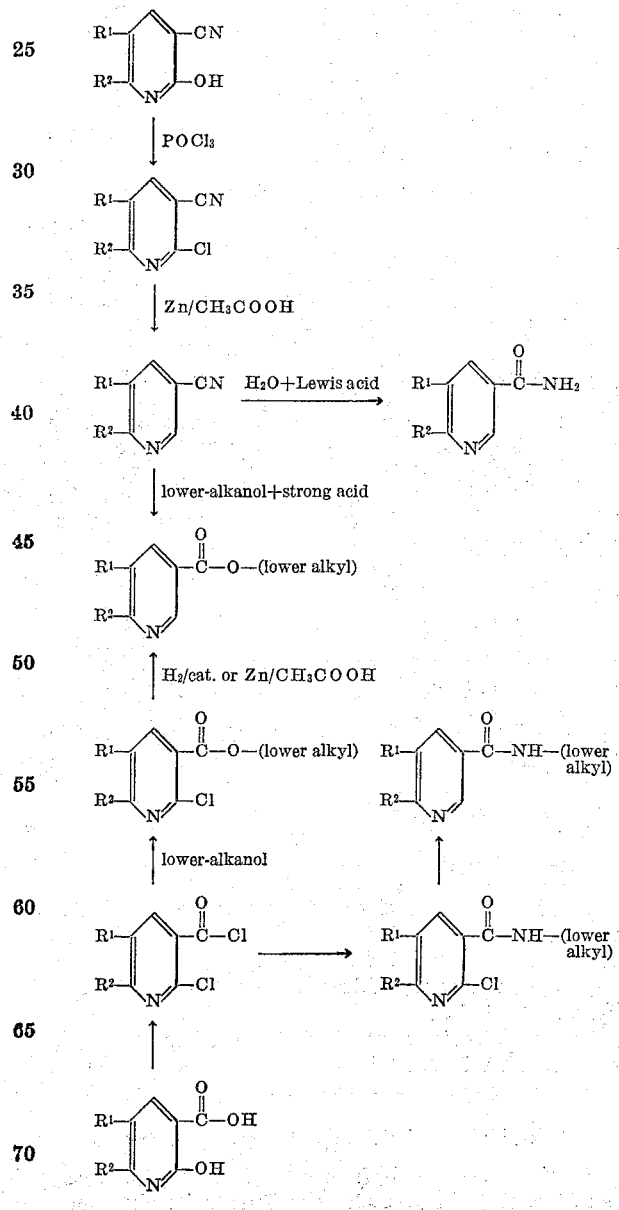

The following examples are given by way of illustration of the invention.

EXAMPLE 1

2-chloro-3-cyano-5,6,7,8-tetrahydroquinoline

2 - hydroxy - 3 - cyano - 5,6,7,8-tetrahydroquinoline [J. Chem. Soc., 107, 1347 (1915)] (185 g.), diethyl aniline (185 ml.) and phosphoryl chloride (925 ml.) were heated under reflux for 2 hours. After evaporating to dryness under reduced pressure and removing the residual phosphoryl chloride by co-distillation with toluene (500 ml.), the residue was dissolved in hot ethanol (1.3 liters) and poured into water (1.3 liters) to give 2-chloro-3-cyano-5,6,7,8-tetrahydroquinoline (193 g.) which crystallized from ethanol in needles of melting point 134°–135° C.

3-cyano-5,6,7,8-tetrahydroquinoline

The foregoing 2-chloro compound (19.3 g.), 83% zinc dust (11.8 g.), sodium acetate trihydrate (13.6 g.) and acetic acid (97 ml.) were stirred for 2 hours at 60° C. Water (49 ml.) was added to dissolve zinc acetate and stirring was continued for a further 2 hours. After adding charcoal (1 g.), kieselguhr (5 g.) and water (49 ml.), the mixture was filtered and the filtrate cooled during the addition of ammonia ($d=880$, 100 ml.) and benzene (100 ml.). The aqueous layer was separated and reextracted with benzene (3 x 25 ml.). The combined extracts were dried (over sodium sulfate), evaporated and the residue was recrystallized from light petroleum (B.P. 60°–80° C.) to give 3-cyano-5,6,7,8-tetrahydroquinoline (14.1 g.), M.P. 84°–85° C.

5,6,7,8-tetrahydroquinoline-3-carboxamide

The foregoing 3-cyano compound (32.6 g.), water (11.1 ml.) and boron trifluoride/acetic acid complex (163 ml.) were stirred for 10 minutes at 115° C. After allowing to cool somewhat, the mixture was poured on to ice and ammonia ($d=880$, 326 ml.), diluted (to 1.6 liters) and the crude product collected. 5,6,7,8-tetrahydroquinoline-3-carboxamide (31.0 g.) crystallized from hot water (1.5 liters) in prismatic needles, M.P. 208°–209° C.

The hydrochloride was prepared by reaction of the amide with hydrochloric acid and crystallized from ethanol in prisms, M.P. 242°–243° C.

The methiodide was prepared by reaction of the amide with methyl iodide and crystallized from methanol in yellow needles (M.P. 216°–219° C.) which darkened on standing. The methyl sulfate was similarly prepared and crystallized from ethanol in needles, M.P. 156°–157° C.

Ethyl 5,6,7,8-tetrahydroquinoline-3-carboxylate 3-cyano-5,6,7,8-tetrahydroquinoline (12.0 g.) in 99% ethanol (60 ml.) was saturated with dry hydrogen chloride and left to stand for ca. 16 hours. The mixture, which contained a quantity of colorless crystals, was heated for 2 hours at 80° C. and evaporated to dryness. The residue was distributed between 2 N sodium carbonate (125 ml.) and ether. The ether layer was separated, dried (over sodium sulfate) and distilled to give ethyl 5,6,7,8-tetrahydroquinoline-3-carboxylate (12.0 g.) as a hygroscopic oil, B.P. 120° C./0.2 mm., $n^{22}$ 1.5330.

The hydrobromide crystallized from acetone/ether in needles, M.P. 153°–155° C. (with dec.), which became brown on exposure to light.

The perchlorate crystallized from ethyl acetate in rods, M.P. 118°–119° C.

The methiodide crystallized from ethanol/ether in orange prisms, M.P. 167° C.

EXAMPLE 2

2-chloro-6-ethyl-5-methyl-3-cyanopyridine 2-hydroxy-3-cyano-6-ethyl-5-methylpyridine [J. Chem. Soc., loc. cit.] (71 g. crude) was boiled with phosphoryl chloride (355 ml.) for 5 hours. After evaporating to dryness under reduced pressure, the residue was recrystallized from methanol to give 2-chloro-6-ethyl-5-methyl-3-cyanopyridine (57 g.) as needles, M.P. 77°–78° C.

6-ethyl-5-methyl-3-cyanopyridine

The foregoing 2-chloro-3-cyano compound was dehalogenated with zinc in acetic acid as described in Example 1 for 3-cyano-5,6,7,8-tetrahydroquinoline. 6-ethyl-5-methyl-3-cyanopyridine was thus obtained and crystallized from light petroleum (B.P. 40°–60° C.) in long prisms, M.P. 55°–56° C.

6-ethyl-5-methylpyridine-3-carboxamide

The foregoing 3-cyano compound was partially hydrolyzed with boron trifluoride in moist acetic acid as described in Example 1 for 5,6,7,8-tetrahydroquinoline-3-carboxamide. 6-ethyl-5-methylpyridine-3-carboxamide crystallized from acetone in needles, M.P. 180°–182° C.

The hydrochloride crystallized from methanol in plates, M.P. 231°–234° C. (with dec.).

Ethyl 6-ethyl-5-methylpyridine-3-carboxylate

A solution of 6-ethyl-5-methyl-3-cyanopyridine (11.3 g.) in 99% ethanol (56 ml.) was saturated with dry hydrogen chloride and left to stand 1 hour, resaturated and left to stand for a further hour. After heating under reflux for 0.5 hour to complete the reaction, the excess ethanol was removed and the residue distributed between ether and 2 N sodium carbonate solution. The ether layer was separated, dried (over sodium sulfate) and distilled to give ethyl 6-ethyl-5-methylpyridine-3-carboxylate, B.P. 163° C./14 mm., $n^{20}$ 1.5142.

The hydrobromide crystallized from isopropanol/ether in short needles, M.P. 161°–162° C. (effervescence).

The methiodide crystallized from acetone/ether in short yellow needles, M.P. 129°–130° C. (with dec.).

EXAMPLE 3

2-chloro-5,6,7,8-tetrahydroquinoline-3-carbonyl chloride

2 - hydroxy - 5,6,7,8 - tetrahydroquinoline - 3 - carboxylic acid [J. Chem. Soc. loc. cit.] (10 g.) was heated under reflux with phosphoryl chloride (50 ml.) for 2 hours. Phosphorus pentachloride (21.6 g.) was added and the heating under reflux continued for 2 hours. Removal of phosphoryl chloride under reduced pressure of nitrogen gave a product pure enough for preparation of further derivatives (v. infra). Nevertheless, in one experiment, 2-chloro-5,6,7,8-tetrahydroquinoline-3-carbonyl chloride (9.4 g.) was distilled at 131° C./0.1 mm. and crystallized from light petroleum (B.P. 60°–80° C.) in needles, M.P. 89°–91° C.

Ethyl-2-chloro-5,6,7,8-tetrahydroquinoline-3-carboxylate

Crude 2 - chloro - 5,6,7,8 - tetrahydroquinoline - 3 - carbonyl chloride prepared from 2-hydroxy-5,6,7,8-tetrahydroquinoline-3-carboxylic acid (98 g.), phosphoryl chloride (490 ml.) and phosphorus pentachloride (212 g.) as described above was freed from entrained phosphoryl chloride by evaporation from toluene (250 ml.). The residue was dissolved in benzene (250 ml.) and treated cautiously with ethanol (60 ml.). Reaction was completed by heating under reflux for 0.5 hours. When cold, the solution was washed with water and with 2 N sodium carbonate solution, dried (over sodium sulfate), evaporated and distilled at 145° C./0.2 mm. to give ethyl 2 - chloro - 5,6,7,8 - tetrahydroquinoline - 3 - carboxylate (115 g.) which crystallized from light petroleum (B.P. 40°–60° C.) in needles, M.P. 48°–49° C.

Ethyl 5,6,7,8-tetrahydroquinoline-3-carboxylate

The foregoing chloro-ester (132 g.) sodium acetate trihydrate (83 g.), 10% palladised charcoal (5 g.) and acetic acid (660 ml.) were shaken under hydrogen for 16 hours. After filtering, the solution was evaporated to dryness and the residue distributed between benzene and a solution of potassium carbonate (100 g.) in water (100 ml.). The benzene layer was separated, dried (over sodium sulfate), evaporated and distilled at 120° C./0.2 mm. to give ethyl 5,6,7,8-tetrahydroquinoline-3-carboxylate identical with the material described in Example 1.

5,6,7,8-tetrahydroquinoline-3-carboxylic acid hydrazide was prepared in ethanol and crystallized from ethanol/benzene in plates, M.P. 185°–186° C.

EXAMPLE 4

*2 - chloro - 5,6,7,8 - tetrahydroquinoline - 3 - carboxylic acid methyl amide*

Crude 2-chloro-5,6,7,8-tetrahydroquinoline-3-carbonyl chloride prepared from 2-hydroxy-5,6,7,8-tetrahydroquinoline-3-carboxylic acid (10 g.), phosphoryl chloride (80 ml.) and phosphorus pentachloride (21 g.) as described in Example 3 was dissolved in pure dry chloroform and added dropwise with stirring to ice cold 10% methylamine (100 ml.). After stirring for an additional hour at ca. 20° C., the chloroform layer was separated, dried (over sodium sulfate) and evaporated. The residue was decolorized by passing its acetone solution over a short alumina column. Recrystallization from benzene gave 2-chloro-5,6,7,8-tetrahydroquinoline-3-carboxylic acid methylamide (9.8 g.) as fibrous needles, M.P. 166°–167° C.

*5,6,7,8 - tetrahydroquinoline - 3 - carboxylic acid methyl amide*

The foregoing chloro-amide was dechlorinated as described for the chloro-ester in Example 3, isolated with chloroform and crystallized from ethyl acetate in prisms, M.P. 127°–129° C.

The hydrochloride crystallized from ethanol/ether in needles, M.P. 217°–219° C. (with dec.).

We claim:

1. A member selected from group consisting of 5,6,7,8-tetrahydroquinoline-3-carboxamide and its N-lower alkyl derivatives and medicinally acceptable acid addition salts of said amides.
2. 5,6,7,8-tetrahydroquinoline-3-carboxamide.
3. 5,6,7,8-tetrahydroquinoline-3-carboxylic acid methyl amide.

References Cited in the file of this patent

UNITED STATES PATENTS 2,695,290  Finkelstein et al. _____ Nov. 23, 1954

FOREIGN PATENTS 582,687  Canada _____ Sept. 8, 1959

OTHER REFERENCES

Badgett et al.: J. American Chemical Society, vol. 67, pages 1135–1138 (1945).

Henecka: Chemische Berichte, vol. 82, pages 41–46 (1949).

Gruber et al.: Monatshefte für Chemie, vol. 81, pages 83–89 (1950).

Dornow et al.: Chemische Berichte, vol. 84, pages 296–297 (1951).